United States Patent [19]

Pinhas

[11] 3,892,799
[45] July 1, 1975

[54] PHENOXYALKYLAMINES AND THEIR SALTS

[75] Inventor: Henri Pinhas, Paris, France

[73] Assignee: Laboratoires Laroche Navarron, Levallois, France

[22] Filed: Dec. 20, 1971

[21] Appl. No.: 210,108

[30] Foreign Application Priority Data
Dec. 28, 1970 France .............................. 70.46876

[52] U.S. Cl.... 260/501.18; 260/348 R; 260/501.19; 260/570 R; 260/570.6; 260/570.7; 260/570.8 R; 260/591; 260/592; 424/316; 424/330
[51] Int. Cl.²......................................... C07C 93/06
[58] Field of Search........ 260/570 R, 570.7, 501.18, 260/501.19

[56] References Cited
UNITED STATES PATENTS

| | | | |
|---|---|---|---|
| 3,278,601 | 10/1966 | Moed............................... | 260/570.6 |
| 3,410,901 | 11/1968 | Kunz et al........................ | 260/570.6 |
| 3,415,873 | 12/1968 | Stevens........................... | 260/570.7 X |
| 3,501,769 | 3/1970 | Crowther et al............. | 260/570.7 X |
| 3,542,792 | 11/1970 | Satzinger ..................... | 260/570.7 X |

*Primary Examiner*—R. V. Hines
*Attorney, Agent, or Firm*—Oldham & Oldham Co.

[57] ABSTRACT

This invention relates to phenoxyalkylamines having the formula:

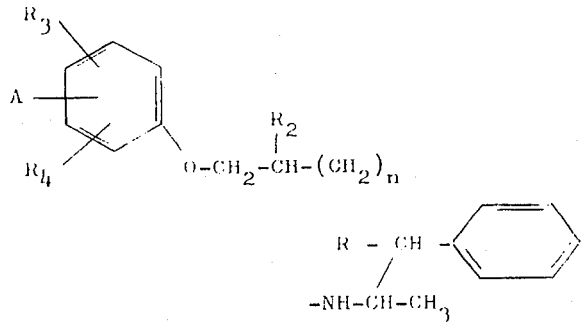

in which $n$ is zero or 1, R is hydrogen or a hydroxy group, $R_2$ is hydrogen, a hydroxy group or an alkyl group, $R_2$ being other than hydroxy when $n$ is zero, $R_3$ and $R_4$, which are not both hydrogen, are selected independently from one another from hydrogen, the halogens, the alkyl groups and the alkoxy groups, and A is the group $-CH_2OH, -CO-R_1$ or

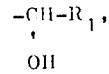

$R_1$ being an alkyl, cycloalkyl or aryl group.

Said phenoxyalkylamines possess coronary vasodilatator and cardiotonic properties.

10 Claims, No Drawings

PHENOXYALKYLAMINES AND THEIR SALTS

The present invention relates to phenoxyalkylamines, to processes for their preparation and to the applications thereof, particularly to human medicine.

There is already known a therapeutic composition useful in particular as coronary Vasodilatator and as antispasmodic drug, comprising, as active ingredient, a phenoxyalkylamine having the formula:

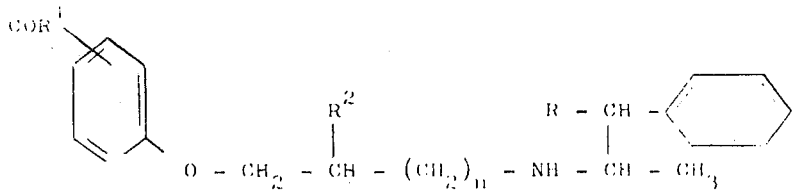

in which $n$ is zero or 1, R is hydrogen or a hydroxy group, $R_1$ is an alkyl group and $R_2$ is hydrogen, a hydroxy group or an alkyl group, $R_2$ being other than hydroxy when $n$ is equal to zero, or a product resulting from hydrogenation of the ketone group $COR_1$ thereof to an alcohol group $CHOHR_1$.

The vasodilatator and spasmolytic properties of said prior phenoxyalkylamines were found to be quite outstanding.

However, there have been found new phenoxyalkylamines which, while having still better vasodilatator and spasmolytic properties than those - although already exceptional — of the prior phenoxyalkylamines, have a better therapeutic ratio than the latter. Phenoxyalkylamines were prepared which exhibit toxicity only at dosages above 500 mg and sometimes up to 1,500 mg under the same experimental conditions as those mentioned above.

Said new phenoxyalkylamines according to the invention have the formula:

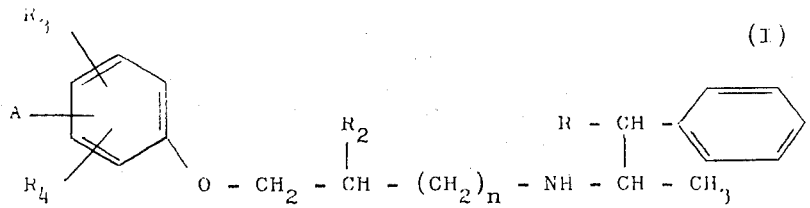

in which $n$ is zero or 1, R is hydrogen or a hydroxy group, $R_2$ is hydrogen, a hydroxy or alkyl group, $R_2$ being other than hydroxy when $n$ is zero, $R_3$ and $R_4$, which are not both hydrogen, are selected independently from one another from hydrogen, the halogens, the alkyl groups and the alkoxy groups, A is the group —$CH_2OH$, —CO—$R_1$ or

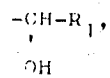

$R_1$ being an alkyl, cycloalkyl or aryl group.

In the above definition, the alkyl groups and the alkyl moisties of the alkoxy groups are advantageously lower radicals, having typically from 1 to 12 carbon atoms and preferably from 1 to 6 carbon atoms.

When $R_1$ is an aryl group, it is advantageously a phenyl group, while the preferred cycloalkyl ring is cyclohexyl.

The phenoxyalkylamines of this invention may also exist in the form of acid addition salts thereof with inorganic or organic acids and typically as the hydrohalides, particularly the hydrochlorides and hydrobromides, as the nitrates, sulfates, methanesulfonates, lactates, citrates, maleates, tartrates, acetylsalicylates, acetates, oxalates, and the like salts which are readily prepared by reacting compounds (I) as the free base with stoichiometrically equivalent amounts of the selected acid or acids.

Formula (I) always includes at least one asymmetrical carbon atoms. It is understood that the invention includes within its scope the optically active and racemic forms of the phenoxyalkylamines having the formule (I).

To prepare said phenoxyalkylamines, an amine of the formula:

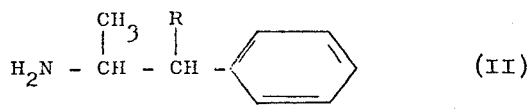

is condensed with a phenoxy intermediate having the formula:

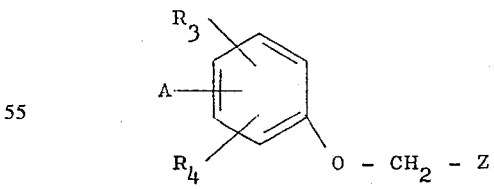

in which Z is a radical selected from the radicals

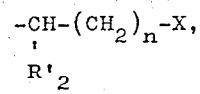

X being a halogen atom and $R'_2$ being a hydrogen atom or an alkyl radical, $$-CH - CH \quad \text{and} \quad -C-R''_2,$$
$$\phantom{-CH}\diagdown\phantom{..}\diagup$$
$$\phantom{-CH-CH-}O\phantom{and-}\overset{\|}{O}$$

$R''_2$ being an alkyl radical, with subsequent hydrogenation of the resulting condensation product when it includes a double bond in the chain, and the resulting compound is optionally reduced, R, $R_3$, $R_4$, A and $n$ having the above-defined meanings.

The ultimate reduction step makes it possible to convert the ketonic phenoxyalkylamines $$(A : -\overset{\|}{\underset{O}{C}}-R_1),$$

if desired, to the alcoholic phenoxyalkylamines $$(A : -\overset{H}{\underset{OH}{C}}-R_1).$$

The phenoxyalkylamines (I) in which $R_2$ is hydrogen are obtained from compounds (III) in which Z is a radical $-CH_2-(CH_2)_n-X$.

The phenoxyalkylamines (I) in which $R_2$ is an alkyl radical are obtained from compounds (III) in which Z is either a radical $$-\underset{R'_2}{CH}-(CH_2)_n-X,$$

$R'_2$ being an alkyl radical, or a radical $$-\underset{\|}{C}-R''_2,$$
$$\phantom{-}O$$

it being understood that in the latter case it is convenient to reduce suitably the double bond formed in the chain.

When group Z represents the group $$-CH - CH_2,$$
$$\phantom{-CH}\diagdown\phantom{..}\diagup$$
$$\phantom{-CH-C}O$$

the condensation reaction gives rise to phenoxyalkylamines hydroxylated in their chain.

It is generally advantageous to conduct the condensation under refluxing conditions within an alcohol solvent, e.g., within ethanol in the presence of excess (3 moles) triethylamine or other basic agents with respect to the stoichiometrically used reagents. When intermediate (III) possesses a ketone function in the side-chain, it is preferred to use a benzene solvent and to remove the water formed during the condensation. In the latter case, the double bond formed in the chain may then be saturated by means of a mild reduction, for example by the catalytic route in the presence of palladium-over-charcoal to give compounds (I) in which A is ketonic.

Whether such ketonic compounds are obtained directly by condensation or are derived from a condensation followed by a reduction, as explained above, they may be reduced to their alcoholic homologs $$(A : -\overset{H}{\underset{OH}{C}}-R_1)$$

by the catalytic route, typically in the presence of platinum oxide or other metal catalysts, and preferably with a metal borohydride such as sodium or potassium borohydride, within an alcohol solvent such as methanol.

When the condensation products unsaturated in the chain are reduced with a borohydride, not only is the double bond reduced, but also the ketone function included in A, so that the alcoholic phenoxyalkylamines are obtained directly.

Intermediates (III) are obtained by reacting a phenol compound of the formula:

$$\underset{R_4}{\overset{R_3}{\diagdown}}\underset{OH}{\bigcirc}-A \quad (IV)$$

with a halogenated compound:

$$Y - CH_2 - Z \quad (V)$$

Y being halogen and the other symbols having the aforementioned meanings.

This reaction is preferably carried out under refluxing conditions in water, in the presence of a stoichiometric amount of a metal hydroxide, typically sodium hydroxide which binds the hydrohalic acid released.

The following examples illustrate the invention.

EXAMPLE 1

3-methyl-4-[2-($\alpha$-methyl-phenethylamino)-ethoxy]-propiophenone $A = -COC_2H_5$; $R_3 = -CH_3$; $R = R_2 = R_4 = H$; $n = 0$ a. 4-(2-bromo-ethoxy)-3-methyl-propiophenone is first prepared from 4-hydroxy-3-methyl-propiophenone and 1,2-dibromoethane.

For this purpose, 4-hydroxy-3-methyl-propiophenone (0.25 mole) is dissolved in water (350 ml) containing sodium hydroxide (0.25 mole). 1,2-dibromo-ethane (0.3 mole) is added to the refluxing solution.

The ether phase is dried, concentrated, and the residue is then distilled; b.p. = 160°–165°C. Yield = 60 %.

b. $\alpha$-methyl-phenethylamine (1 mole), 4-(2-bromo-ethoxy)-3-methyl-propiophenone (1 mole) and triethylamine (3 moles) dissolved in ethanol (600 ml) are refluxed during 48 hours. The solvent is removed in vacuo. The residue is dissolved in an organic solvent (diethyl ether or ethyl acetate). A 10 % hydrochloric acid solution is added with vigorous stirring. The crystals are suction filtered. 3-methyl-4-[2-($\alpha$-methyl-phenethylamine)-ethoxy]-propiophenone hydrochloride is recrystallized from ethanol (Yield 60 %), m.p. = 182°–186°C.

The phenoxyalkylamines of the five following examples are prepared in the same manner.

EXAMPLE 2

3,5-Diiodo-4[2-($\alpha$-methyl-phenethylamino)-ethoxy]-propiophenone

A = COC$_2$H$_5$; R = R$_2$ = H; R$_3$ = R$_4$ = I; n = 0

3,5-Diiodo-4-(2-bromo-ethoxy)-propiophenone is first prepared (via 1,2-dibromo-ethane) under the conditions described in Example 1. (Yield = 30 %). M.p. = 118°C.

This bromo derivative is then condensed with α-methyl-phenethylamine, under the previously described conditions, to give 3,5-diiodo-4-[2-( α-methyl-phenethylamino)-ethoxy]-propiophenone hydrochloride (Yield = 40 %), which melts at 202°–204°C.

EXAMPLE 3

3-Methoxy-4-[2-(α-methyl-phenethylamino)-ethoxy]-cyclohexanophenone hydrochloride melts at 178°–181°C.

A = —CO-C$_6$H$_{11}$; R$_3$ = —OCH$_3$; R = R$_2$ = R$_4$ = H; n = 0

EXAMPLE 4

A = —CO—C$_3$H$_7$; R$_3$ = Cl; R = R$_2$ = R$_4$ = H; n = 0

3-Chloro-4-[2-(α-methyl-phenethylamino)-ethoxy]-butyrophenone hydrochloride melts at 185°–188°C.

EXAMPLE 5

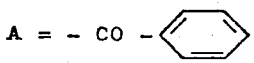

R$_3$ = —OCH$_3$; R = R$_2$ = R$_4$ = H; n = 0

3-Methoxy-4-[2-(α-methyl-phenethylamino)-ethoxy]-benzophenone hydrochloride melts at 168°–172°C.

EXAMPLE 6

A = CO—C$_2$H$_5$; R$_3$ = CH$_3$; R = OH; R$_2$ = R$_4$ = H; n = 0

3-Methyl-4-[2-(α-methyl-β-hydroxy-phenethylamino)-ethoxy]-propiophenone hydrochloride melts at 177°–180°C.

EXAMPLE 7

3-Methoxy-1-[(1-cyclohexyl-1-hydroxy)-methyl]-4-[2-(α-methyl-phenethylamino)-ethoxy]-benzene and its hydrochloride.

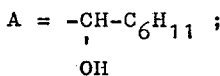

R$_3$ = —OCH$_3$; R = R$_4$ = R$_2$ = H; n = 0

Potassium borohydride (0.12 mole) is gently added to 3-methoxy-4-[2-(α-methyl-phenethylamino)-ethoxy]-cyclohexanophenone (0.1 mole) dissolved in 90 % methanol (150 ml), at a temperature below 0°C.

After about 18 hours, the methanol is removed between 30° and 40°C, in vacuo. The residue is taken up into water and ether. The organic phase is thoroughly washed with water. The dried ether phase is evaporated. The residue is converted to the hydrochloride. The white crystals recrystallize from alcohol-ether. M.p. 160°–162°C. (Yield = 85 %).

EXAMPLE 8.

1-(1-hydroxy-propyl)-3-methyl-4-[2-(α-methyl-phenethylamino)-ethoxy]-benzene and its hydrochloride.

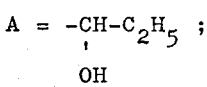

R$_3$ = —CH$_3$; R$_2$ = R$_4$ = R = H; n = 0

3-Methyl-4-[2-(α-methyl-phenethylamino)-ethoxy]-propiophenone is reduced in the usual manner with potassium borohydride, to give 1-(1-hydroxy-propyl)-3-methyl-4-[2-(α-methyl-phenethylamino)-ethoxy]-benzene hydrochloride, which melts at 130°–135°C.

EXAMPLE 9

3-Methyl-4-[2-hydroxy-3-(α-methyl-phenethylamino)-propoxy]-cyclohexanophenone.

A = —CO—C$_6$H$_{11}$; n = 1; R$_2$ = OH; R = R$_4$ = H; R$_3$ = —CH$_3$

3-Methyl-4-(2,3-epoxy-propoxy)-cyclohexanophenone is first prepared. For this purpose, 3-methyl-4-hydroxy-cyclohexanophenone (0.1 mole) is dissolved in 5 % sodium hydroxide (0.1 mole) and 1-chloro-2,3-epoxy-propane (0.11 mole) is added to the stirred solution, over 1 hour.

After 24 hours, the resulting crystals are suction filtered and are then washed with water and dried.

The residue is distilled: b.p.$_{0.5}$ = 180°–186°C. Yield = 70 %.

α-Methyl-phenethylamine (0.1 mole) and 3-methyl-4-(2,3-epoxy-propoxy)-cyclohexanophenone (0.1 mole) in concentrated alcohol (100 ml) are then refluxed during four hours. The solvent is removed in vacuo. The residue is taken up into diethyl ether. 5 % Hydrochloric acid is added, with vigorous stirring, to give a precipitate of 3-methyl-4-[2-hydroxy-3-(α-methyl-phenethylamino)-propoxy]-cyclohexanophenone hydrochloride which is recrystallized from ethanol, m.p. = 165°–168°C.

EXAMPLE 10

The ketone function of the product obtained in example 9 is reduced with borohydride, under the usual conditions.

There is obtained 3-methyl-1-[(1-cyclohexyl-1-hydroxy)-methyl]-4-[2-hydroxy-3-(α-methyl-phenethylamino-propoxy]-benzene hydrochloride, m.p. = 130°–136°C.

EXAMPLE 11

3-Chloro-4-[2-(α-methyl-phenethylamino)-propoxy]-cyclohexanophenone.

A = —CO—C$_6$H$_{11}$; R$_2$ = —CH$_3$; n = 0; R = R$_4$ = H; R$_3$ = Cl

3-Chloro-4-hydroxy-cyclohexanophenone (0.1 mole) and sodium hydroxide (0.1 mole) are dissolved in 80 % alcohol (100 ml).

Chloracetone (0.12 mole) is then added dropwise to this solution. After refluxing during seven hours, the reaction mixture is concentrated in vacuo, extracted with ether and is then washed with 5 % sodium hydroxide and with water.

The residue is then distilled: b.p.$_{0.2}$ = 183°–187°C. (Yield = 52 %).

3-Chloro-4-(2-oxo-propoxy)-cyclohexanophenone (0.02 mole) and α-methyl-phenethylamine (0.02 mole) are then heated in benzene solution.

The water formed in the reaction is removed with a Dean-Stark trap.

The solvent is removed in vacuo and the residue is hydrogenated in the presence of 5 % palladium-over-charcoal, in alcohol solution, at room temperature, under 2 kg hydrogen pressure.

The alcohol is removed. The residue is taken up into ether and abundantly washed with water. The ether phase is dried and then concentrated. The hydrochloride is then prepared. M.p. = 133°–137°C.

The acute toxicities of said materials were investigated orally, in Swiss mice and Sprague Dawley rats.

The animals are fasted 18 hours prior to the single administration of the product and are kept under supervision 14 days during which their behavior and death rate were noted.

The $LD_{50}$ of said products, investigated in both species and calculated according to the method according to Litchfield and Wilcoxon are of the order of from 500 to 1500 mg/kg.

II. CORONARY DILATATOR ACTION

1. On the isolated heart — Langendorff's method.

The tests were carried out on the hearts of Fauve de Bourgogne (about 2 kg) rabbits. The hearts are rapidly taken out and maintained in surviving condition by perfusion of a physiological (Tyrode type) liquid heated at 37°C and oxygenated under a constant pressure of 50–60 cm of water. Perfusion of the hearts was effected counter-currently, and volumetric determinations of the coronary rate of flow were recorded at thirty second intervals.

After stabilization of the basic rate of flow, the products, dissolved in physiological saline solution, are injected in a volume of from 0.05 to 0.2 ml.

Dose-action curves were established from the various results obtained.

The products produce a marked increase of the coronary rate of flow which is apparent at a dosage of 10 γ; a 50 % increase of the original rate of flow is obtained, depending on the test products, at a dosage comprised within the range from 15 γ to 100 γ.

2. On the whole animal

The tests were carried out in male and female dogs having a weight between 10 and 15 kg.

After chloralose-induced anesthesia, the animals are placed under artificial respiration.

The carotid pressure is recorded, together with the cardiac frequency and the electrocardiogram.

The coronary flux is investigated by means of a nycotron.

The test materials were dissolved in physiological saline solution and administrated by the intravenous route.

Increase of the coronary flux is observed at dosages from 0.5 to 2 mg/kg.

III. ACTION ON CONTRACTILE STRENGTH

The tests were carried out either in the whole animal, or in the isolated heart.

Dogs, both male and female, are anesthetized with chloralose.

Systemic blood pressure is recorded at the level of the carotid with an electric sensor.

The contractile strength of the heart was measured with a strain gauge attached to the wall of the right ventricle.

The products, dissolved in physiological saline solution, are administered intravenously (external saphenous vein).

The phenoxyalkylamines of this invention produce an increase of the contractile strength of the heart which becomes more marked with time. Generally, this action has a duration of over one hundred minutes. The cardiotonic action is apparent at dosages from 0.5 to 2 mg/kg.

The products were tested on the isolated heart of rabbit maintained in surviving condition by Langendroff's method. The contractile strength is measured by means of a strain gauge attached to the right ventricle. Cardiac stimulation is apparent at dosages of about 200 γ.

It is apparent from such tests that the phenoxyalkylamines of this invention and their non-toxic salts are useful in human therapeutics for the curative or preventive treatment of heart conditions, as coronary vasodilatator, cardiotonic and spasmolytic drug.

In such applications, the therapeutic composition is advantageously administered orally, at a dosgae of from 150 to 750 mg of active ingredient per 24 hours.

Any formulations suitable for this route of administration may be used, the active ingredient being admixed with a pharmaceutically acceptable carrier or excipient.

An example of such a formulation is given:

Tablets containing each : 50 mg (average dose)
100 mg (strong dose).

Excipients : Talc
Lactose
Mg stearate, q.s. to make 1 tablet.

Having now described my invention what I claim and desire to secure by Letters Patent is:

1. A compound selected from the group consisting of 3-Methyl-4-[2-(α-methyl-phenethylamino)-ethoxy]-propiophenone and its non-toxic acid addition salts.

2. A compound selected from the group consisting of 3-Chloro-4-[2-(α-methyl-phenethylamino)-ethoxy]-butyrophenone and its non-toxic acid addition salts.

3. A compound selected from the group consisting of 3-Methoxy-1-[(1-cyclohexyl-1-hydroxy)-methyl]-4-[2-(α-methyl-phenethylamino)-ethoxy]-benzene and its non-toxic acid addition salts.

4. A compound selected from the group consisting of 1-(1-Hydroxy-propyl)-3-methyl-4-[2-(α-methyl-phenethylamino)-ethoxy]-benzene and its non-toxic acid addition salts.

5. A compound selected from the group consisting of 3-Methyl-4-[2-hydroxy-3-(α-methyl-phenethylamino)-propoxy]-cyclohexanophenone and its non-toxic acid addition salts.

6. A compound selected from the group consisting of 3,5 diiodo-4-[2-(α-methyl-phenethylamino)-ethoxy]-propiophenone and its non-toxic acid addition salts.

7. A compound selected from the group consisting of 3-methoxy-4-[2-(α-methyl-phenethylamino) ethoxy]cyclohexanophenone and its non-toxic acid addition salts.

8. A compound selected from the group consisting of 3-methoxy-4-[2-(α-methyl phenethylamino)ethoxy]-benzophenone and its non toxic acid addition salts.

9. A compound selected from the group consisting of 3-methyl-1-[(1-cyclohexyl-1-hydroxy)-methyl]-4-[2-hydroxy-3-(α-methyl phenethylamino)-propoxy]benzene and its non-toxic acid addition salts.

10. A compound selected from the group consisting of 3-chloro-4-[2-(α-methyl-phenethylamino)-propoxy]cyclohexanophenone and its non-toxic acid addition salts.

* * * * *